Feb. 24, 1959 — A. A. ALLEN — 2,875,306
MOUNTING MEANS FOR SWITCH UNITS
Filed April 19, 1957

INVENTOR.
ALAN A. ALLEN
BY
Hyman Jackman
ATTORNEY

United States Patent Office 2,875,306
Patented Feb. 24, 1959

2,875,306

MOUNTING MEANS FOR SWITCH UNITS

Alan A. Allen, Beverly Hills, Calif., assignor to Milli-Switch Corporation, Santa Monica, Calif., a corporation of California Application April 19, 1957, Serial No. 654,014

1 Claim. (Cl. 200—168)

This invention relates to means for mounting switch units particularly electric switches of the snap-action type.

Switches of the above character are conventionally housed in bodies or cases usually formed in molds of standard molding powders. One such powder comprises Durez 11864, a phenolic material, and Diallyl Phthalate 52–01, a plasticizer. The Durez 11864 is a standard molding powder of the phenol-formaldehyde type and the same may be described as a low-power-factor compound especially adapted for use in high frequency parts and is used for this purpose also because of its excellent molding properties. When this powder is used with Diallyl Phthalate 52–01 as a plasticizer, a strong and rigid molded product is obtained that retains its rigidity under normal or under even fairly high ambient temperatures. However, such a phenolic article will yield to forces tending to distort it if the temperature reaches about 350 F.° or thereabouts. Such distortion occurs particularly if the body is under compression or is otherwise placed under stress.

It will be understood that the molded article above described and used to form a case for electric snap switches, is intended as exemplary of dielectric compounds which, while varying in make-up and/or composition, nevertheless, have distortion characteristics under conditions as above outlined.

In cases where such molded phenolic and comparable compounds are used to form housings or bodies for small snap switch mechanisms, particularly where the switch blade may be as small as one-half inch long and of a thickness in the nature of .004 inch, environmental or ambient temperatures may increase so greatly relative to the room temperatures under which such switches were assembled, and especially if said bodies are under stress or pressure of their mounting screws, such material distortion in the body may occur as will deleteriously affect the proper action of the switch. Such distortion may be largely obviated by not drawing tightly on the mounting bolts or screws. In such case, however, the danger of the screws becoming too loosened and the switch becoming loose and subject to excessive vibration is increased. The latter is particularly true when the switches are being subjected to extraordinarily high speeds, acceleration and/or forces, as in aircraft, rockets and other missiles. In either case, the sensitive switch mechanism encased in the housing loses its accuracy, at the very least, and, under extreme conditions, may fail to function at all.

Accordingly, an object of the present invention is to provide means, in snap switch units and the like, and which are housed in dielectric molded bodies that are subject to pressure-induced distortion, to absorb pressures or stresses of mounting bolts or screws and, thereby, obviate subjecting such bodies to such stresses.

Another object of the invention is to provide a snap switch of the general character above referred to with means enabling firm gripping, clamping or otherwise affixing the molded dielectric body of such a switch onto a support or mount in such manner that the body is unstressed but, nevertheless, will be firmly held in operative position.

The foregoing and other objects, features and advantages of the invention are realized in the means hereinafter described, the same comprising details, combinations of elements, and arrangements of parts illustrated, in two exemplary manners in the accompanying drawing on which said description is based.

Figure 1:
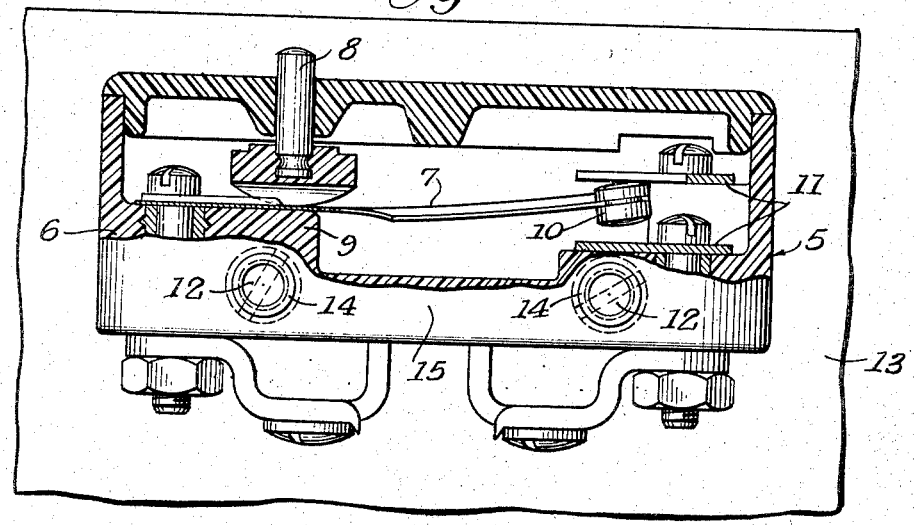
Fig. 1 is a side elevational view of the means of the present invention applied to a switch unit, said unit being shown in mounted position and partly in longitudinal section.

The switch 5 that is illustrated in exemplary, the same showing a switch case 6 that houses a snap switch mechanism. Said mechanism is shown as comprising a switch blade 7, an actuator 8 that when pressed produces transverse flexure of said blade across a support platform 9 thereby to cause longitudinal flexure of the blade and movement of a contact or button on the free end of the blade between stationary contacts carried by the case.

It will be understood that the above generally-described switch, or one comparable thereto, may, in practice, be considerably smaller than shown. One such snap switch being presently manufactured has a blade 7 that is about one-half inch long, the case 6 being only about three-quarters of an inch long. It will be realized, therefore, that the switch 5 may be small indeed and, if the case 6 is, as is usually the case, made of molded dielectric material of which the mentioned phenolic compound is an example, stresses induced by the mounting means, such as screws 12, which affix the switch 5 onto a support 13, may subject said case 6 to heat distortion. Such support may take any desired form and is here shown as a mounting plate.

Figure 2:
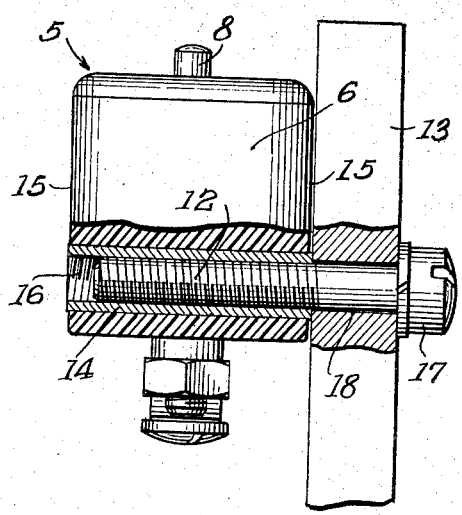
Fig. 2 is an end elevational view of the means shown in Fig. 1, partly in cross-section.

According to the invention, as shown in Figs. 1 and 2, at least two tubular metal members 14 extend transversely through the case or body 6, the ends of said tubular members being either flush with the sides 15 of the case or, as shown, slightly over-flush. In practice, said members 14 are in the form of inserts in a mold in which the case or body is formed under heat and pressure. Therefore, said members 14 are firmly affixed in the molded body and are not subject to endwise displacement nor to rotation relative to the body. In the form of Figs. 1 and 2, said tubular members are shown as provided with internal threads 16, the same being engaged by the threads of the mounting screws 12.

As seen in Fig. 2, said screws 12 are applied with their heads 17 on the side of the mounting plate 13 that is opposite to the side adjacent which the switch 5 is mounted, said screws passing through clearance holes 18 in plate 13. It will be clear that, no matter how firmly the screws are drawn up, there can be no compression of the body 6 and no transmission of stresses to the body from the screws, the entire stress that may be set up is taken in compression by the metal inserts 14.

Figure 3:
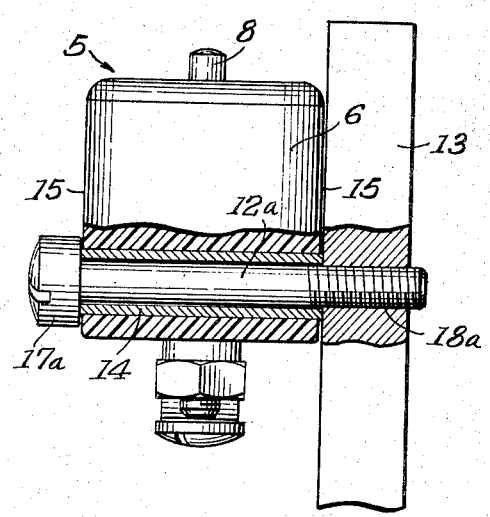
Fig. 3 is a view, similar to Fig. 2, of a modification.

In the modification of Fig. 3, the tubular members 14 have clear unthreaded bores or passages through which the screws 12a pass, said screws being engaged in threaded holes 18a in plate 13 with the heads of said screws bearing against the outer ends of the tubular members 14. In this case, also, firm take-up on the mounting screws cannot produce compression or other stresses on the case 6 since the same is received in compression by the members 14.

It can be seen that, irrespective of other considerations, the mounting means in no way affects the switch case or body, nor can any distortion of the case due to high ambient temperatures affect the mounting.

Switches without means, such as tubes 14 have heat distortion which causes the mounting screws to become loosened thereby loosening the switch on its mount. Thus, the actuator is unevenly controlled since the actuation point 8 of the switch can, and frequently does, change from a pre-set position. Such shifting is quite undesirable especially in cases where the switches are used in systems that require exact retention of the pre-set actuation points for optimum accuracy of operation. The tubes 14, as above explained, insure against such possibility of shift of the switches.

While the foregoing speaks of heat-distortable molded material for the case 6, there are instances when the distortion may be caused by cold. Thus, temperatures abnormally above and below room or assembly temperatures will deleteriously affect the case as above indicated.

The foregoing describes preferred forms of the invention, the same, however, being capable of modification without departing from the spirit and scope of the invention as defined in the appended claim. Accordingly, I desire to reserve to myself such variations and modifications as may fall within the scope of said claim.

Having thus described my invention, what I claim and desire to obtain by Letters Patent, is:

In a miniature snap action electric switch having a moulded phenolic case that distorts under heat and when pressure is applied thereto, said switch including a support platform for the switch blade thereof, means to minimize such case distortion by mounting screws, said means comprising at least two metal tubular inserts extending completely transversely through said phenolic case with their ends at least flush with the opposite sides of the case, one of said inserts being placed directly beneath said support platform so that the actuation point for said switch may be constant under extremes of temperature fluctuation.

References Cited in the file of this patent
UNITED STATES PATENTS

| | | |
|---|---|---|
| 2,605,373 | Jeffery | July 29, 1952 |
| 2,647,247 | Fulton et al. | July 28, 1953 |
| 2,691,711 | Ellis | Oct. 12, 1954 |
| 2,776,347 | Allen | Jan. 1, 1957 |